June 16, 1931.  A. D. SIMS ET AL  1,810,061
STALK AND WEED CUTTER
Filed Oct. 14, 1930  3 Sheets-Sheet 1
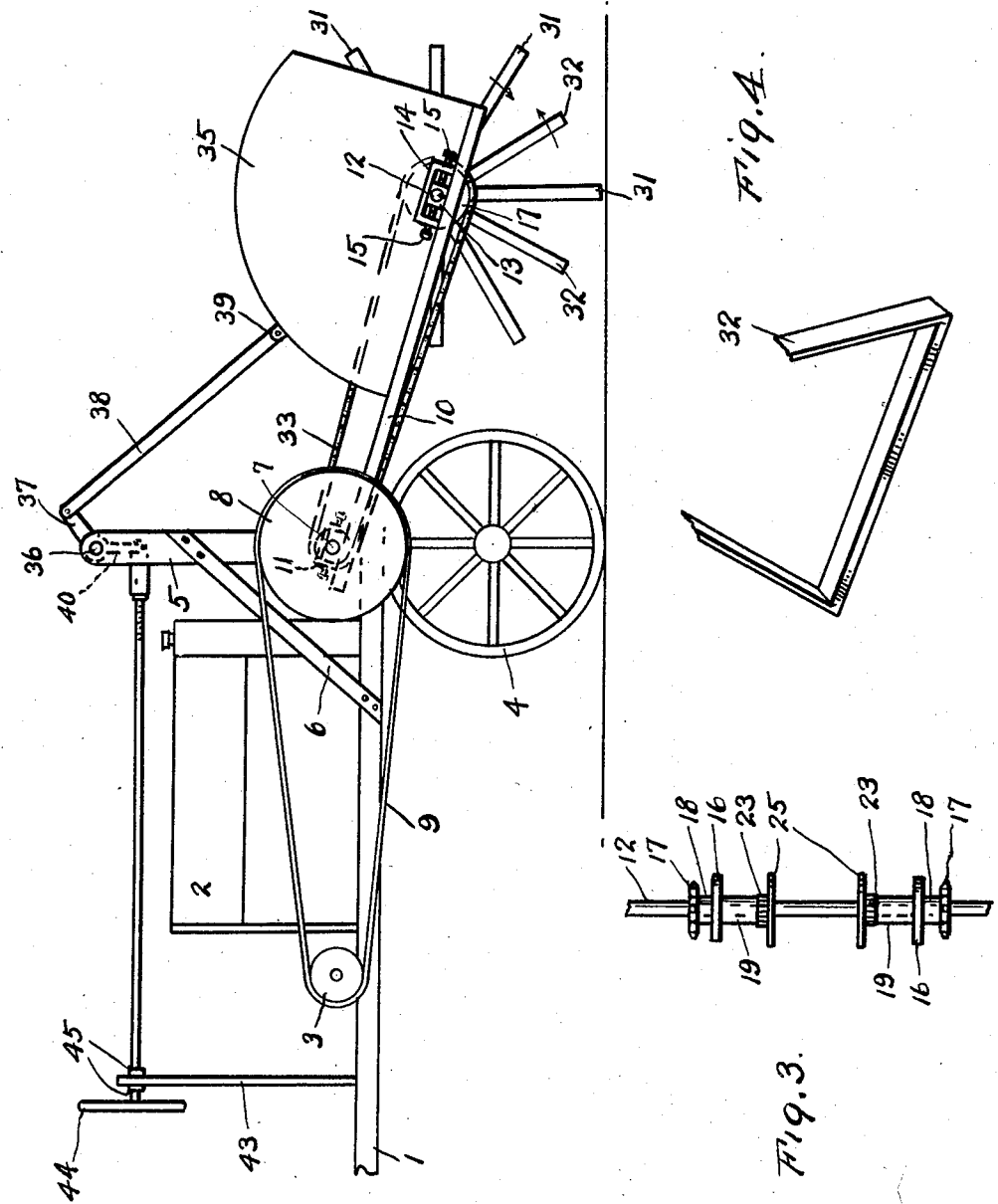
Inventors
A. D. Sims
A. C. Wright
By Clarence A. O'Brien
Attorney June 16, 1931. A. D. SIMS ET AL 1,810,061
STALK AND WEED CUTTER
Filed Oct. 14, 1930   3 Sheets-Sheet 2
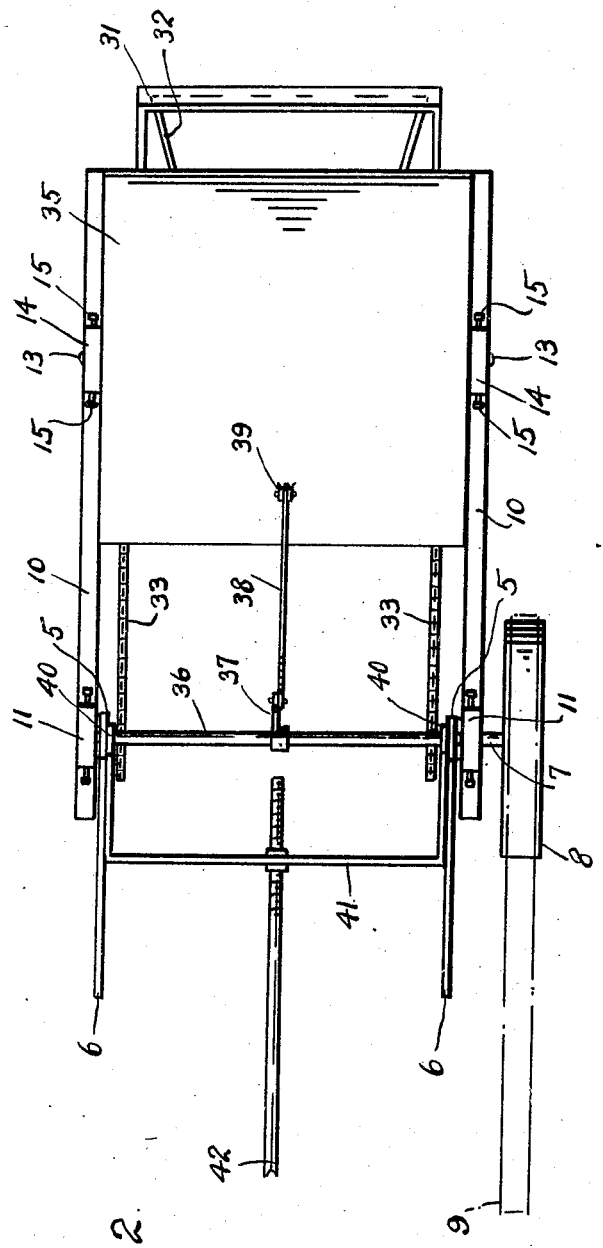
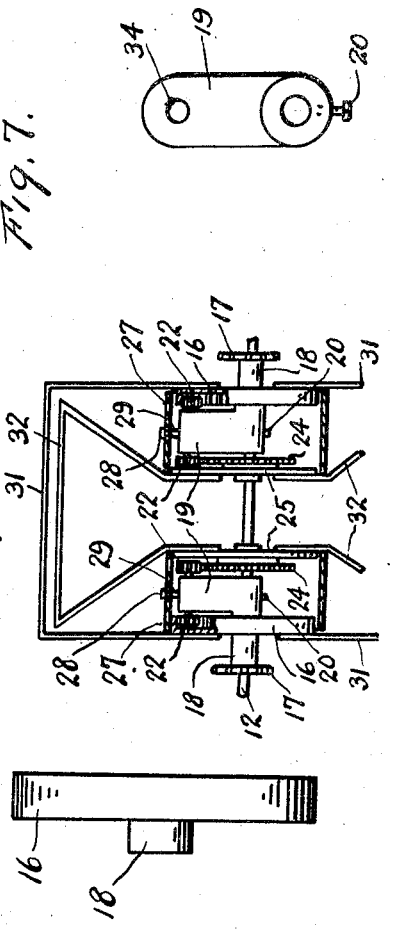
Inventors
A. D. Sims
A. C. Wright
By Clarence A. O'Brien
Attorney

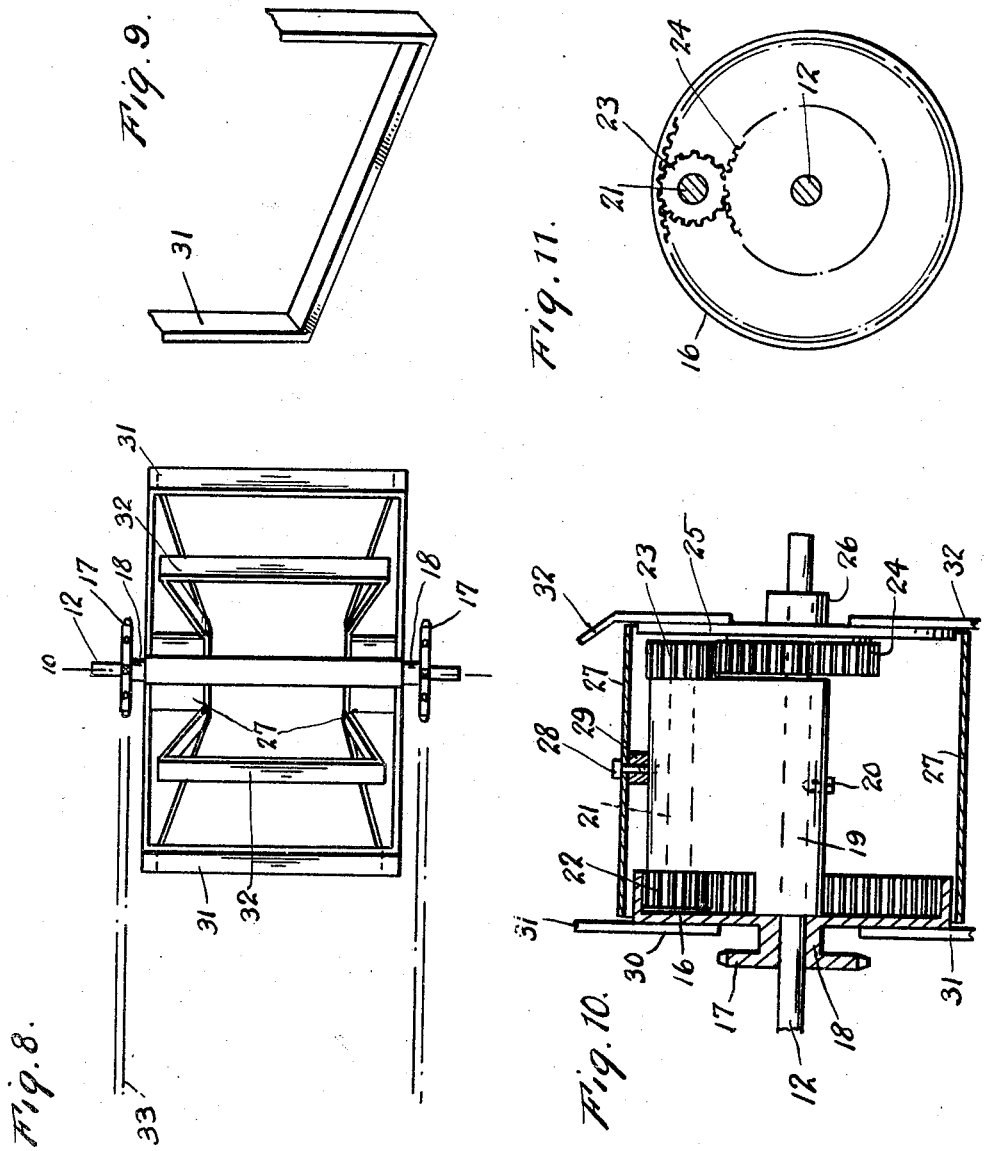

Patented June 16, 1931

1,810,061

UNITED STATES PATENT OFFICE

ANGUS D. SIMS AND ARCH C. WRIGHT, OF QUITMAN, MISSISSIPPI

STALK AND WEED CUTTER

Application filed October 14, 1930. Serial No. 488,652.

This invention relates to a stalk and weed cutter and has for one of its important objects to provide, in a manner as hereinafter set forth, a device of this character which is adapted to be mounted on the front of a tractor or the like and which further includes means for operative connection with the collar take-off of the engine of the tractor for actuation by said engine.

Another important object of the invention is to provide a stalk and weed cutter of the aforementioned character embodying an inner and an outer series of rotary cutters which bevel in opposite directions, the inner cutters being driven at a speed materially greater than the speed of the outer cutters.

Another important object of the invention is to provide a stalk and weed cutter of the character set forth embodying means within convenient reach of the operator of the tractor for adjusting the cutting mechanism vertically and with respect to the ground.

Other objects of the invention are to provide, in a manner as hereinafter set forth, a stalk and weed cutter which will be simple in construction, strong, durable, efficient in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein;

Figure 1 is a view in side elevation showing a stalk and weed cutter constructed in accordance with this invention mounted in operative position on the forward end portion of a tractor.

Figure 2 is a view in top plan of the device showing same detached from the tractor.

Figure 3 is a detail view in top plan showing the mechanism for driving the inner and outer series of cutting plates in opposite directions, the casings being removed from the mechanism.

Figure 4 is a fragmentary detail view in perspective showing a portion of one of the inner cutters.

Figure 5 is a detail view in elevation of one of the annular internal gears.

Figure 6 is a view principally in front elevation and partly broken away in section showing the driving mechanism for the inner and outer cutters.

Figure 7 is a detail view in end elevation of one of the brackets forming an element of the driving mechanism illustrated in Figures 3 and 6.

Figure 8 is a detail view in top plan showing the inner and outer series of cutters.

Figure 9 is a fragmentary detail view in perspective of one of the outer cutters.

Figure 10 is a detail view in vertical longitudinal section on an enlarged scale carrying the rotating mechanism or unit with which one end of each of the inner and outer cutters is connected.

Figure 11 is a vertical cross sectional view through one of the cutter driving units looking into one of the annular internal gears.

Referring to the drawings in detail, it will be seen that the reference numeral 1 designates the forward portion of a tractor frame having mounted therein the engine 2 provided with the usual power take-off pulley 3. The front wheels of the tractor are designated by the reference numeral 4.

A pair of spaced uprights 5 are mounted on the forward end portion of the frame 1 of the tractor and braced by the members 6. A transversely extending shaft 7 is journaled in the lower end portions of the uprights 5 and has its opposite ends terminating outwardly of the uprights. A drive pulley 8 is fixed on one end portion of the shaft 7 and is operatively connected to the power take-off pulley 3 of the tractor by a belt 9. A pair of coextensive, spaced, parallel, forwardly extending bars in or mounted for swinging movement on the shaft 7 adjacent the outer sides of the uprights 5 through the medium of bearings 11. A stationary transverse shaft 12 has its opposite end portion keyed in the supporting blocks 13 which are slidably mounted for longitudinal adjustment on the forward portions of the bars 10 in the guides 14 adjusting screws 15 are threaded through the ends of the guides 14 for engagement with opposite sides of the blocks 13 for adjusting said blocks longitudinally on the bars 10 and for maintaining said blocks in adjusted position.

Rotatably mounted on the stationary shaft 12 adjacent the inner side of each of the bars 10 is an internal angular gear 16 having a sprocket gear 17 on its hub portion 18. Also fixed on this stationary shaft 12 adjacent the inner side of the gears 16 is an upstanding bracket 19 which is rigidly secured to the shaft 12 by a suitable set screw 20 (see Figure 10).

The shaft 21 is journaled in the outer end portion of each of the upstanding brackets 19 and has fixed on one end portion a gear 22 which meshes with the internal gear 16 which is adjacent one end of the bracket 19. The other end of the shafts 21 have fixed thereon a gear 23 which is in mesh with a gear 24 which, in turn, is fixed on one side of a disk 25 which is rotatably mounted on the stationary shaft 12 and retained against movement in one direction on said shaft 12 by a collar 26. An annular housing 27 is mounted on each of the brackets 19 in a manner to inclose the gears hereinbefore described, said casing or housing being secured by any suitable means such as the bolt 28 and a spacing collar 29.

A series of outer cutters of substantially U-shape have their opposite end portions rigidly secured to the outer sides of the gears 16 as indicated at 30. The outer cutters are designated by the reference numeral 31 and the end portions thereof may be secured to the gears 16 by any suitable means, such as soldering or welding. A series of inner cutters 32 have their opposite end portions fixed in any suitable way, as by soldering or welding, to the inner or opposed sides of the disks 25. As will be apparent, the cutters 31 and 32 are radially disposed. The guide portions of the inner cutters 32 converge inwardly to their points of connection with the disks 25. Endless sprocket chains 33 are trained over the sprocket gears 17 and over gears fixed on the shaft 7 adjacent the inner sides of the uprights 5 for driving the gears 16 and the outer cutters 31 in one direction and for driving the disks 25 and the inner cutters 32 in the opposite direction through the medium of the gears 22, 23, 24 and the shaft 21 which is journaled in the bore 34 (see Figure 7) provided therefor in the respective brackets 19.

A hood or shield 35 is supported on the bars 10 and disposed over the cutters in the manner clearly illustrated in Figures 1 and 2 of the drawings. A transversely extending shaft 36 is journaled in the upper end portions of the uprights 5 and has fixed to an intermediate portion a forwardly and upwardly extending arm 37. A link 38 has one end portion pivotally connected to the free end portion of the arm 37 and its opposite end portion pivotally connected to the hood or shield 35, as at 39. Depending arms 40 are fixed on the end portions of the shaft 36 adjacent the inner sides of the uprights 5 and pivotally connected to the free end portions of each of the depending arms 40 is one end portion of a substantially U-shaped bracket 41 through an intermediate portion of which the threaded forward end portion of an adjusting screw rod 42 is threaded. The rear end portion of the adjusting screw rod 42 is rotatably supported on a standard 43 and said rear end portion has fixed thereon an operating wheel 44. Collars 45 are fixed on the adjusting screw rod 42 and engageable with opposite sides of the standard 43 for retaining the screw rods in longitudinal position.

As will be apparent, when the adjusting screw rod 42 is rotated the shaft 36 will be rocked through the medium of the brackets 41 and the depending arms 40. In this manner the cutters may be expeditiously adjusted relative to the ground through the medium of the link 38 which has one end connected to the arm 37 fixed on the shaft 36 and its other end connected to the hood or shield 35. As will be apparent, the sprocket chains 33 may be tightened or loosened through the medium of the adjusting screws 15, as before explained.

It is believed that the many advantages of a stalk and weed cutter constructed in accordance with this invention will be readily understood, and although the preferred embodiment of the invention is as illustrated and described, it is to be understood that changes in the details of construction may be had which will fall within the scope of the invention as claimed.

What is claimed is:

1. A stalk and weed cutter of the character described comprising a supporting structure, a transverse stationary shaft mounted on the supporting structure, brackets fixed on the shaft, a rotary shaft journaled on each bracket, gears fixed on the end portions of each of the rotary shafts, annular internal gears rotatably mounted on the stationary shaft outwardly of each bracket, the annular gears being operatively engaged with one of the gears on the adjacent rotary shafts, sprocket gears fixed on the annular gears, disks rotatably mounted on the stationary shaft inwardly of the brackets, gears fixed on the disks and engaged with the other of the gears on the rotary shafts for actuation thereby in a direction opposite to the direction of rotation of the annular gears, a series of outer cutters rigidly secured, at their ends, to the annular gears and radiating therefrom, a series of inner cutters rigidly secured, at their opposite ends, to the disks, and means connected with the sprocket gears for rotating the annular gears.

2. A stalk and weed cutter of the character described comprising a supporting structure, a transverse stationary shaft mounted on the supporting structure, brackets fixed on the shaft, a rotary shaft journaled on each bracket, gears fixed on the end portions of each of the rotary shafts, annular internal gears rotatably mounted on the stationary shaft outwardly of each bracket, the annular gears being operatively engaged with one of the gears on the adjacent rotary shafts, sprockets gears fixed on the annular gears, disks rotatably mounted on the stationary shaft inwardly of the brackets, gears fixed on the disks and engaged with the other of the gears on the rotary shafts for actuation thereby in a direction opposite to the direction of rotation of the annular gears, a series of outer cutters rigidly secured, at their ends to the annular gears and radiating therefrom, a series of inner cutters rigidly secured, at their opposite ends, to the disks, and means connected with the sprocket gears for rotating the annular gears, collars fixed on the stationary shaft and engaged with the disks for preventing sliding movement of the disks in one direction on the shaft, and an annular housing mounted on each of the brackets, and encircling the adjacent gears.

3. In combination with a tractor including a wheeled frame, a power plant and a power take-off operatively connected with the power plant, a pair of uprights mounted on the forward end portion of the frame, a transverse shaft journaled in the lower end portions of the uprights, means operatively connecting the shaft to the power take-off of the tractor, a pair of spaced, parallel, forwardly extending bars mounted for swinging movement on the end portions of the shaft, a pair of sprocket gears fixed on the shaft, a stationary shaft mounted on the bars forwardly of the tractor, an inner and an outer series of cutters rotatably supported on the stationary shaft and radiating therefrom, and means for operatively connecting the inner and outer series of cutters to the sprocket gears on the first named shaft for rotation in opposite directions.

4. In combination with a tractor including a wheeled frame, a power plant and a power take-off operatively connected with the power plant, a pair of uprights mounted on the forward end portion of the frame, a transverse shaft journaled in the lower end portions of the uprights, means operatively connecting the shaft to the power take-off of the tractor, a pair of spaced, parallel, forwardly extending bars mounted for swinging movement on the end portions of the shaft, a pair of sprocket gears fixed on the shaft, a stationary shaft mounted on the bars forwardly of the tractor, an inner and an outer series of cutters rotatably supported on the stationary shaft and radiating therefrom, and means for operatively connecting the inner and outer series of cutters to the sprocket gears on the first named shaft for rotation in opposite directions, a hood mounted on the bars and disposed over the cutters, a transverse rock shaft journaled in the upper end portions of the uprights, an arm fixed on the rock shaft, a link operatively connecting the arm to the shield, and manually operable means connected with the rock shaft for actuating same in a manner to swing the cutters in a vertical plane relative to the ground.

5. In combination with a tractor including a wheeled frame, a power plant and a power take-off operatively connected with the power plant, a pair of uprights mounted on the forward end portion of the frame, a transverse shaft journaled in the lower end portions of the uprights, means operatively connecting the shaft to the power take-off of the tractor, a pair of spaced, parallel, forwardly extending bars mounted for swinging movement on the end portions of the shaft, a pair of sprocket gears fixed on the shaft, a stationary shaft mounted on the bars forwardly of the tractor, an inner and an outer series of cutters rotatably supported on the stationary shaft and radiating therefrom, and means for operatively connecting the inner and outer series of cutters to the sprocket gears on the first named shaft for rotation in opposite directions, a hood mounted on the bars and disposed over the cutters, a transverse rock shaft journaled in the upper end portions of the uprights, an arm fixed on the rock shaft, a link operatively connecting the arm to the shield, and manually operable means connected with the rock shaft for actuating same in a manner to swing the cutters in a vertical plane relative to the ground, said means comprising a pair of depending arms fixed on the end portions of the rock shaft, a substantially U-shaped bracket pivotally connected at its ends, to the free end portions, of the depending arms, a standard mounted vertically on the tractor frame in rearwardly spaced relation to the uprights, a screw rod having one end portion journaled in the standard and its other end portion threaded through an intermediate portion of the substantially U-shaped bracket, and an operating wheel fixed on the screw rod.

In testimony whereof we affix our signatures.

ANGUS D. SIMS.
ARCH C. WRIGHT.